J. D. REIFF.
GOVERNING DEVICE.
No. 175,755. Patented April 4, 1876.
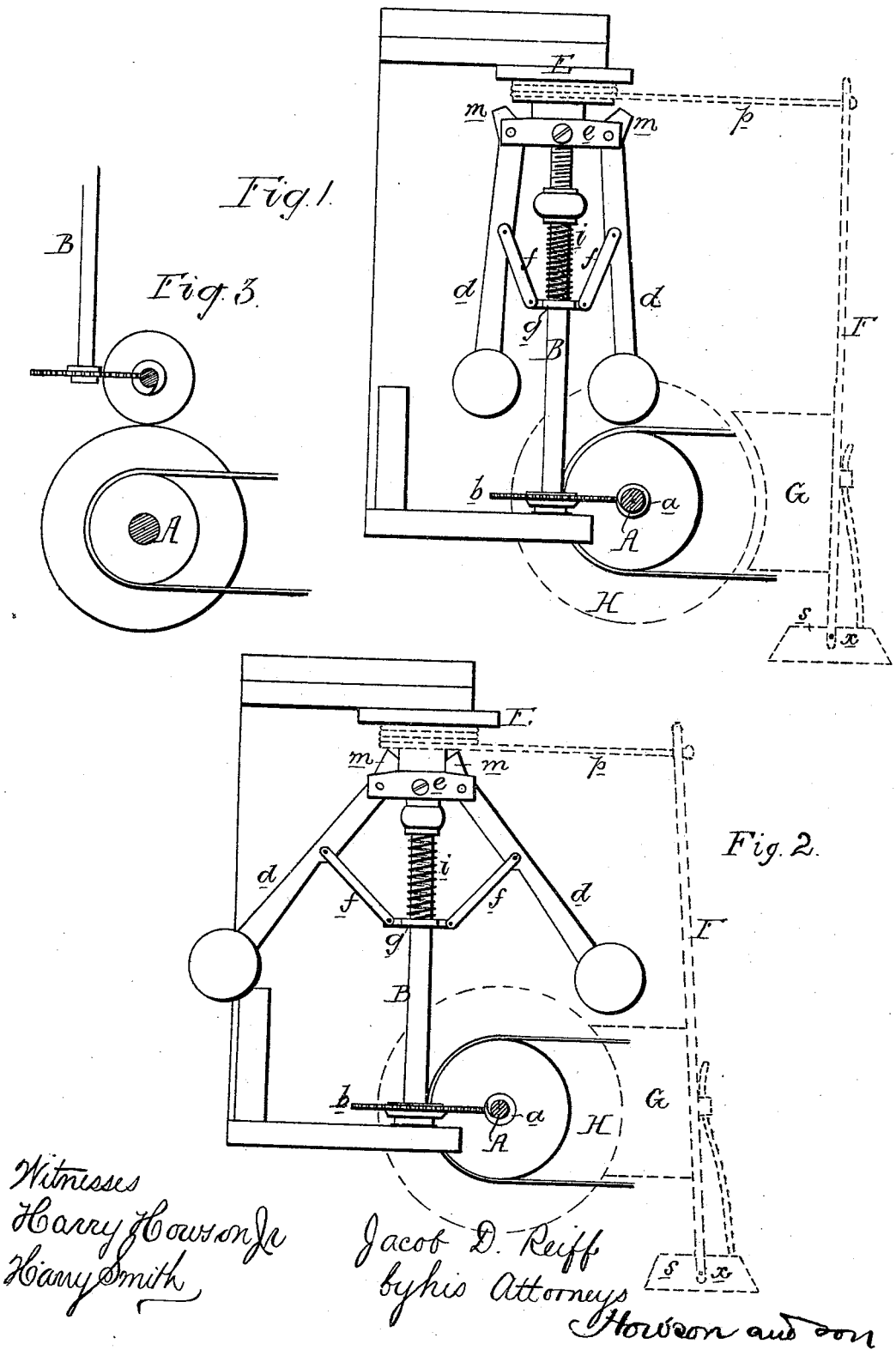

UNITED STATES PATENT OFFICE.

JACOB D. REIFF, OF SKIPPACKVILLE, PENNSYLVANIA.

IMPROVEMENT IN GOVERNING DEVICES.

Specification forming part of Letters Patent No. 175,755, dated April 4, 1876; application filed March 4, 1876.

*To all whom it may concern:*

Be it known that I, JACOB D. REIFF, of Skippackville, Montgomery county, Pennsylvania, have invented an Improved Governing Device, of which the following is a specification:

The object of my invention is to construct an effective governing device for machinery, and this object I attain in the manner which I will now proceed to describe, reference being had to the accompanying drawing, in which—

Figure 1 is a side view of my improved governing device; and Fig. 2, the same, with the parts in a different position.

A is the shaft, the speed of which is to be governed, and this shaft carries, in the present instance, a scroll, $a$, gearing into a pinion, $b$, secured to the lower end of a vertical shaft, B, carrying a centrifugal governor, of the usual class, with weighted arms $d$, hung to a head, $e$, secured to the shaft B, and connected by means of rods $f$ with a sliding sleeve, $g$, which is so acted upon by a spring, $i$, as to tend to depress the arms $d$. The arms $d$ are continued above the head $e$ in the present instance, forming fingers $m$ adjacent to the lower portion of a pulley, E, which turns loosely on the shaft B. Around this pulley is wound a rope or chain, $p$, connected at the outer end to the upper end of a lever, F, hung at $x$ to a fixed standard, $s$, and carrying a brake-shoe, G, the face of which is adapted to the circumference of a wheel, H, on the shaft A.

When the shaft A is revolving at its regular speed the spring $i$, acting on the sleeve $g$, will keep the arms $d$ depressed, and their fingers $m$ free from contact with the pulley E; but when from any cause, such as the breaking of the belt, the shaft A commences to run at a dangerous speed the increased speed of the shaft B will cause the arms $d$ to be thrown outward, and their fingers $m$ to clutch the pulley E, and turn the same, winding up the cord or chain $p$, and drawing the brake G against the wheel H with sufficient force to retard or stop the machine.

It will be evident that, in carrying out my invention, different forms of clutches may be used for effecting the revolution of the winding drum or pulley, and in some cases the shaft B, instead of being driven directly from the shaft A, may be driven from a supplementary shaft, receiving its movement from the shaft A in any suitable manner, an instance of this mode of driving being shown in Fig. 3.

I claim as my invention—

1. A centrifugal governor combined with, and arranged on, an undue increase of speed to operate the pulley E, and its cord or chain $p$, connected to the brake mechanism, as set forth.

2. The combination of the arms $d$ of a centrifugal governor and their fingers $m$ with the pulley E and its cord or chain $p$, connected to the brake mechanism, substantially as described.

In testimony whereof I have signed my name to this specification in the presence of two subscribing witnesses.

JACOB D. REIFF.

Witnesses:
HARRY SMITH,
HARRY HOWSON, Jr.